United States Patent [19]

Tappeiner et al.

[11] 4,321,581
[45] Mar. 23, 1982

[54] POWERLINE CARRIER CONTROL SYSTEM

[75] Inventors: Hermann Tappeiner; Ernst-Robert Paessler, both of Erlangen; Kurt Smutny, Neunkirchen; Karl-Heinz Krügel, Erlangen, all of Fed. Rep. of Germany

[73] Assignee: Siemens Aktiengesellschaft, Munich, Fed. Rep. of Germany

[21] Appl. No.: 17,085

[22] Filed: Mar. 5, 1979

[30] Foreign Application Priority Data

Mar. 10, 1978 [DE] Fed. Rep. of Germany ....... 2810534

[51] Int. Cl.³ ............................................... H04B 3/54
[52] U.S. Cl. .................... 340/310 R; 307/3; 455/114
[58] Field of Search ........ 340/310 R, 310 A, 310 CP; 325/55, 64, 170, 123, 124, 129; 307/3, 140, 149; 455/35, 68, 114

[56] References Cited

U.S. PATENT DOCUMENTS

| | | | |
|---|---|---|---|
| 1,547,242 | 7/1925 | Strieby | 340/310 R |
| 2,630,367 | 3/1953 | Rahmel | 340/310 R |
| 2,974,221 | 3/1961 | Peth | 325/64 |
| 3,942,170 | 3/1976 | Whyte | 340/310 R |
| 3,952,294 | 4/1976 | Emerson et al. | 340/310 R |
| 4,021,797 | 5/1977 | Hofmeister | 340/310 A |

OTHER PUBLICATIONS

Siemens-Zeitschrift, Paessler, Feb. 1974.

Primary Examiner—James J. Groody
Attorney, Agent, or Firm—Kenyon & Kenyon

[57] ABSTRACT

A powerline carrier control system having a carrier transmitter which delivers an audio-frequency output voltage, subdivided into transmitted pulses, to a powerline carrier control receiver via a coupling unit and the power distribution network. In order to reduce ringing (after-oscillation) of the coupling unit, an auxiliary decay circuit switches the AC voltage being transmitted into a phase shift or into phase opposition to offset the after-oscillation. In this manner, distortion of the transmitted information is largely avoided.

10 Claims, 21 Drawing Figures

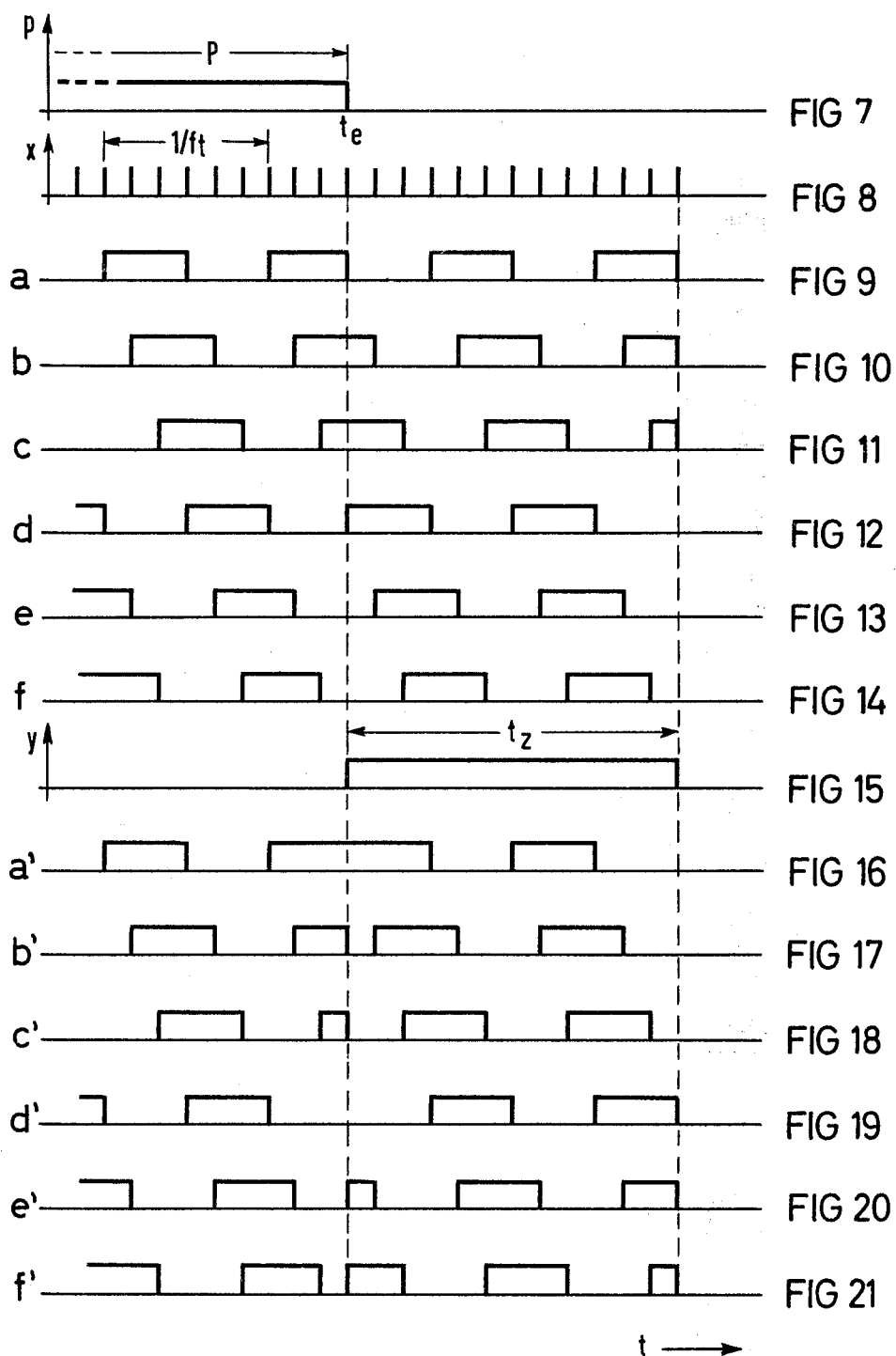

POWERLINE CARRIER CONTROL SYSTEM

BACKGROUND OF THE INVENTION

1. Field of the Invention

This invention relates to a centralized, multistation, powerline carrier control system having a powerline carrier transmitter. More particularly, it relates to a carrier transmitter which employs a pulse inverter and generates a keyed audio frequency output voltage in forming transmitting pulses, the output being fed, via a coupling unit, into an AC power distribution network.

2. Description of the Prior Art

Ways are known by which information may be transmitted to power users by means of a centralized powerline control system in which the single or multiple phase electric distribution network serves as the transmission path. Such information may serve, for instance, for initiating switching actions in distribution networks, for switching users' watt/hour meters to different rates (for instance, high and low rates), or for notifying a person or persons (for instance, the fire department).

A centralized, multistation, powerline carrier control system consists essentially of a power line carrier transmitter, a coupling unit network for feeding the signal into the distribution network, and of one or more powerline carrier receivers which are connected to the distribution network and can be used for control purposes at the user's location. The carrier transmitter generates an audio frequency (AC) output voltage coded in accordance with the information to be transmitted, which is superimposed by the coupling unit on the AC line voltage in the electric power network. Selective powerline carrier receivers connected to the network decode the transmitted signals and perform the tasks for which they were installed. The frequency of the voltage being distributed is usually 50 or 60 Hz, and the audio frequency chosen is generally between 110 and 400 Hz.

A powerline carrier control system of this type is described in "Siemens-Zeitschrift" 48 (1974), pages 69 to 75, which shows a coupling network for either a series feed or parallel feed (loc. cit., FIG. 2). The parallel feed unit can comprise and L-C combination and an isolation transformer; in the three-phase case, a series circuit having a series choke and a series capacitor is arranged in each lead on the network side of the isolation transformer, and a compensating capacitor is placed between each of the three leads on the transmitter side (loc. cit., FIG. 3). Or, the series feed unit can be an L-C unit and a coupling (feed) transformer; in the three-phase case, three delta-connected, shunt capacitors are connected, on the one hand, to the lines between the carrier transmitter and the coupling transformers, the coupling transformers being connected on the other hand, to one of each of three chokes, the other ends of which are connected to an appropriate junction point of three more delta-connected capacitors (loc. cit., see FIG. 4).

German Offenlegungsschrift No. 24 56 344 (U.S. Pat. No. 4,021,797) shows a powerline carrier control system which uses, as a powerline carrier control transmitter, a static frequency changer having a linefed diode rectifier, an intermediate voltage circuit with a capacitor, and a three-phase, pulsed inverter connected thereto, the pulsed inverter being constructed from power thyristors.

In powerline carrier control systems of the type just described, an undesired lengthening of a code element or transmitter pulse occurs when the transmission of the signal voltage stops because the entire L-C combination (in the case of parallel feed) or the L-C unit (in the case of series feed) continues to oscillate, or "ring", for several periods. This unwanted lengthening of each transmitted signal results in falsification (distortion) of the transmitted information, and can lead to error in operation (malfunction) of the powerline carrier control receivers. Such lengthening occurs in both series and parallel feed units. However, it has been found that the lengthening of the transmitter pulses is especially large in parallel feed units and is particularly troublesome there.

It is an object of the invention to substantially, if not completely, eliminate such distortion of the transmitter pulse in the transmission of information on a powerline carrier control system, particularly one having a parallel feed unit, by measures taken on the transmitter side.

SUMMARY OF THE INVENTION

According to the present invention, this problem is solved by means of an auxiliary decay circuit which continues to operate the powerline carrier control transmitter for a short time after the end of the transmitter pulse, and which influences the AC output voltage in such a way that after-oscillation of the AC voltage at the coupling unit is shortened or substantially eliminated.

In a powerline carrier control system using a series feed unit, the ascertainable decay is shortened as determined at the coupling transformer. In a powerline carrier control using a parallel feed unit, on the other hand, the decay measurable on the power network bus bar is what must be shortened.

According to a preferred further embodiment of the invention, the AC output voltage of the powerline carrier control transmitter is shifted in phase, relative to the decaying AC voltage, beginning at the end of the keyed transmitter pulse, by 180° (phase opposition) or less, which is immediately set and then maintained. In the alternative, an intermediate phase shift somewhat less than 180° (for instance, 60°) is set and then a continuous or step-wise transition is made to a value slightly less than or equal to 180° (phase opposition). In this case, switching is performed with a delay instead of suddenly, so as to avoid an excessively large current in the powerline carrier control transmitter. In any case, care is taken to avoid overcompensation of the excess energy stored in the L-C combination or in the L-C unit, respectively, as a result of switching reversal.

The latter embodiment utilizing phase shift of the AC output voltage can be realized, in particular, in a powerline carrier control system having a pulsed inverter as the powerline carrier control transmitter.

According to the invention, the auxiliary decay circuit switches the AC output voltage of the powerline carrier control transmitter for a short time after the transmitter pulse has ended in such a way that the AC voltage transmitted in phase-shifted or is put in phase opposition to the ringing voltage (after-oscillation), providing a shortened decay time at the end of a transmitter pulse. The undesired lengthening of the transmitted pulses is therefore prevented in large degree and the shape of the end of the pulse transmitted is brought close to conformity with the ideal. This results in an improvement in selectivity and also in increased reliability as seen in correct receipt, on the receiving side, of a powerline carrier control message. This is especially significant in a powerline carrier control system having a parallel feed unit where a considerable shortening of the decay can be achieved.

BRIEF DESCRIPTION OF THE DRAWINGS

FIGS. 7 to 21 show firing pulses for the controlled valves of the powerline carrier control transmitter during switching at the end of a transmitted pulse.

DETAILED DESCRIPTION OF THE INVENTION

Figure 1:
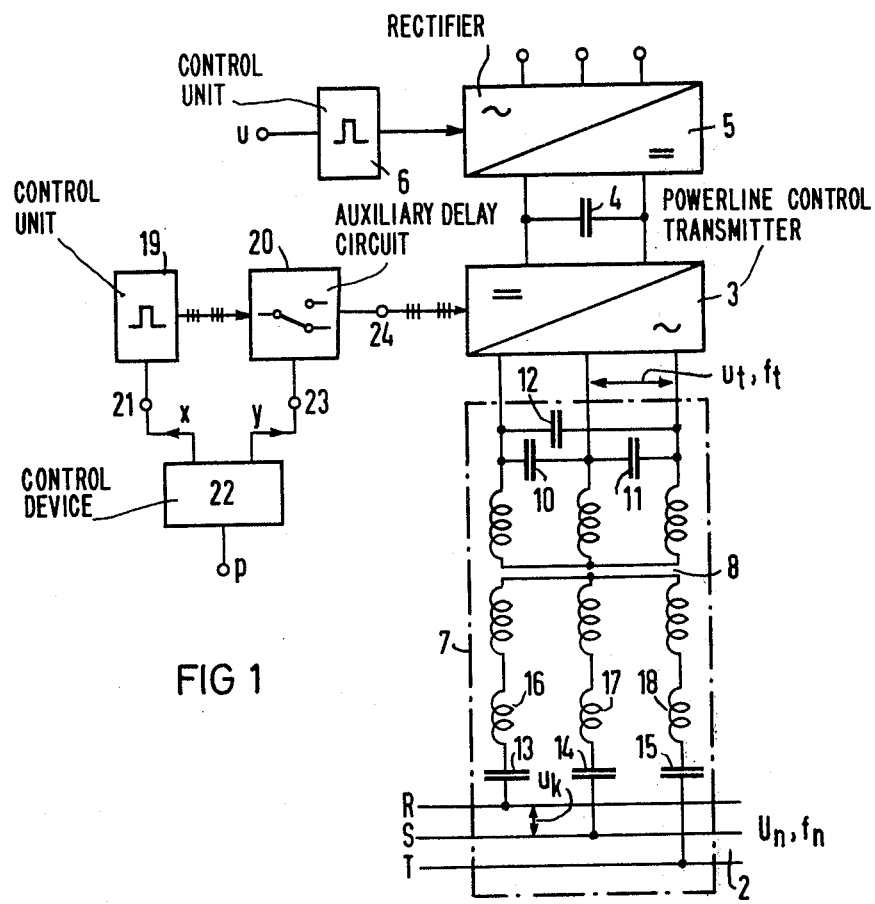
FIG. 1 is a block diagram schematically illustrating a powerline carrier control transmitter having a coupling unit and an auxiliary decay circuit in accordance with the teachings of the invention.

FIG. 1 shows a block diagram of the transmitting side of a powerline carrier control system employing a parallel feed unit. Connection to the receiving side is established through an AC power voltage distribution network 2 by means of individual phase conductors R, S, T. The AC power network 2 is operated with an AC line voltage $U_n$, at a line frequency $f_n$. The line frequency can be, for instance, 50 or 60 Hz.

The powerline carrier control transmitter 3 used in the present illustrative embodiment is an inverter having controlled valves, such as a pulsed thyristor inverter. As will be understood, other types of inverter may also be used. Control transmitter 3 is connected, via an intermediate voltage link having a shunt-connected capacitor 4, to the output of a rectifier 5, which, in turn, is powered by a three phase AC supply network (not shown).

Rectifier 5 may employ controlled or uncontrolled valves in a bridge circuit. When controlled valves are used, the voltage supplied to the intermediate voltage link may be controlled by a control unit 6 as a function of a control signal u.

Between the output of powerline carrier control transmitter 3 on the AC side and AC distribution voltage network 2 is located a three phase coupling unit 7, shown here specifically as a parallel feed unit of a kind well known in the art. As will be understood, a series feed unit could also be used.

Parallel feed coupling unit 7 comprises a transformer 8, preferably an isolation transformer, and L-C combinations of chokes and capacitors. A battery of three compensation capacitors 10, 11, 12 is connected between the three leads of the primary winding of transformer 8 of control transmitter 3 on the transmitter side. In each lead on the network side, a series circuit, consisting of a series capacitor 13, 14, or 15 and a series choke 16, 17 or 18, respectively, is inserted in each lead between the secondary winding of the transformer 8 and the individual phase conductors R, S, T. Each series circuit 13, 16; 14, 17; and 15, 18 is resonant at the audio frequency $f_t$.

Powerline carrier control transmitter 3 is addressed with firing and quenching pulses for the controlled valves by a control unit 19 via auxiliary decay circuit 20. Control unit 19 has, in turn, its input connected to the output of a control device 22 which addresses it by a control signal x. At another output 23, the control device 22 delivers a second control signal y, which is utilized for actuating the auxiliary decay circuit 20. Control device 22 is activated by a keying signal p. The output of auxiliary decay circuit 20 is designated 24.

Powerline carrier control transmitter 3 generates a three-phase AC output voltage $U_t$ at audio frequency $f_t$; the latter can have a value between about 110 and about 400 Hz. The AC output voltage $U_t$ consists of individual rectangular voltage pulses and is keyed by means of the keying signal p in accordance with the information to be transmitted. AC output voltage $U_t$ therefore takes the form of a train of pulses of variable length P as shown in FIG. 2.

In the illustrative embodiment, the auxiliary decay circuit 20 is shown, symbolically, in the form of a simple, double-throw device shown in FIG. 1 as a double-throw switch inside of the block for inverting the phase of the drive. As will be seen, decay circuit 20 interchanges the phase sequence of the firing and quenching pulses for the controlled valves of the powerline carrier control transmitter when control signal y is applied. This results in the AC output voltage $U_t$ being inverted; i.e., the AC output voltage $U_t$ is shifted 180° in phase (phase opposition). For the purpose of this shift (switching-over), the control signal y is given at the end of each transmit pulse for a time period $t_z$. Thereby, after-oscillation of the transmit pulses transmitted to AC voltage network 2 can largely be prevented.

Figure 2:
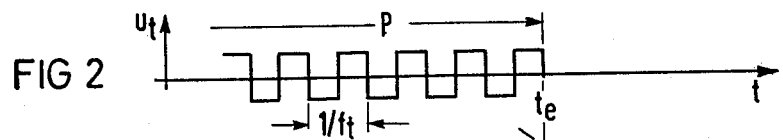
FIGS. 2 and 3 show the waveform of the AC output voltage of the powerline carrier control transmitter and of the related voltage at the coupling unit during conventional, uninfluenced decay, respectively.

The waveform of the AC output voltage $U_t$ is shown in FIG. 2. Voltage $U_t$ consists of rectangular positive and negative going voltage pulses which are generated by the cycling of inverter 3. The time $t_e$ marks the end of a transmit, or message, pulse of length P, established according to the control signal P. From then until the next signal, the AC output voltage is zero. Because the length, and thereby the information content of the signal being transmitted is determined by the end time $t_e$, instant $t_e$ should be ascertainable by the receiver unequivocally and as precisely as possible.

Figure 3:
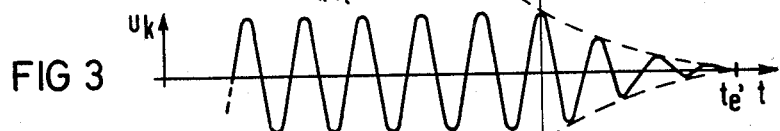

FIG. 3 shows the waveform of the corresponding sinusoidal AC voltage $U_k$ at the power line coupling point, between the phase conductors R, S. There it can be seen that an undesired lengthening of the transmit pulse comes about after the power line carrier control transmitter 3 is switched off. The transmit pulse does not reach zero at the time $t_e$, but only at a later time $t_e'$. The reason for this is that the combination of L-C elements 10 to 18 continues to oscillate and decay for several periods after the powerline carrier control transmitter 3 is switched off.

Figure 4:
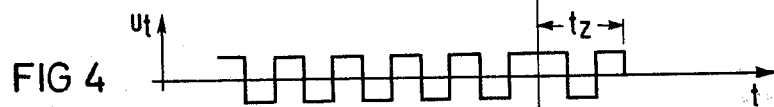
FIGS. 4 and 5 show the AC output voltage waveform of the powerline carrier control transmitter and the corresponding waveform of the voltage at the coupling unit when an auxiliary decay circuit according to the invention is used.
Figure 5:
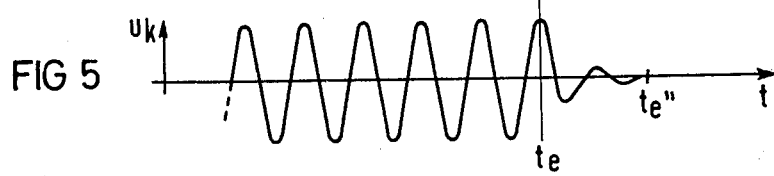

How this ringing or after-oscillation is shortened, according to the invention, by suitable timing of the powerline carrier control transmitter 3, after the end of the transmit pulse at time $t_e$ is shown in FIGS. 4 and 5.

As can be seen in FIG. 4, the operation of powerline carrier control transmitter 3 is not simply stopped at time $t_e$, but rather is continued for a time $t_z$. During the time $t_z$, however, the decay unit is switched into phase opposition by cycling to accelerate the decay process. It can be seen from FIG. 5 that, as a result, the ringing decays quickly, as compared to FIG. 3, and that, at the time $t_e''$ which is substantially earlier than the end time $t_e'$, the AC voltage $U_k$ has already become zero.

This is achieved by auxiliary decay circuit 20 (FIG. 1) which insures that, after the end time $t_e$ of a transmitter pulse, the output AC voltage $U_t$ of control transmitter 3 is modified to shorten or largely avoid after-oscillation at the coupling point. To this end, control signal y acts upon auxiliary decay circuit 20 and fixes the end of the signal by means of timing voltage $U_t$ in phase opposition to the decaying AC voltage, for the end $t_e$ of the transmitter pulse on to the time $t_2$.

Figure 6:
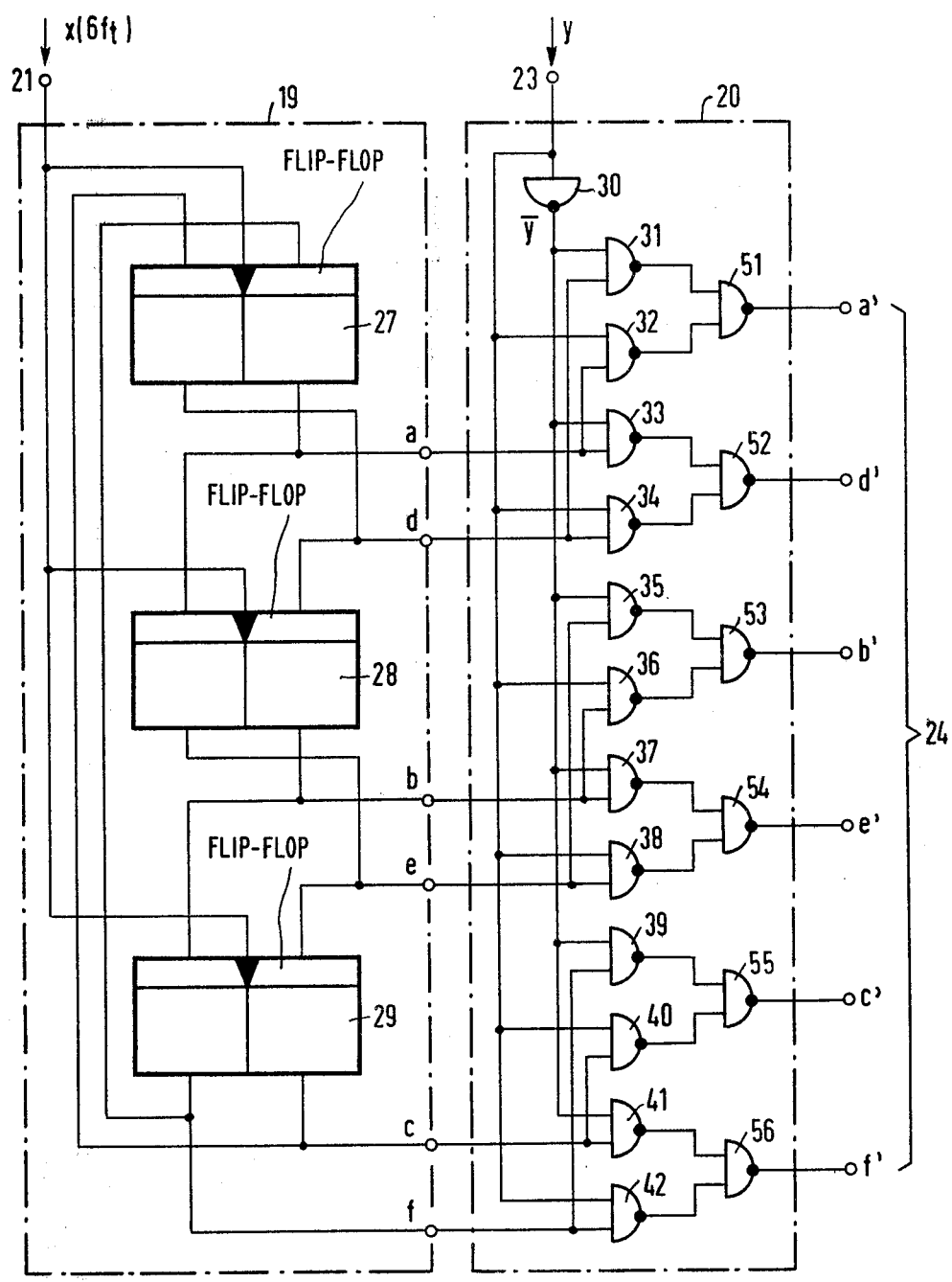
FIG. 6 is a schematic drawing showing details of an auxiliary decay circuit in accordance with the invention.

FIG. 6 shows details of control unit 19 and of auxiliary decay circuit 20. In the illustrative embodiment, control unit 19 is a ring counter consisting of three flip-flops 27, 28 and 29, each of which is acted upon by the control signal x as well as by the output signals of the two other flipflops. At each flip-flop output, an output signal a to f is taken off.

The six output signals a to f are passed on to the auxiliary decay circuit 20, which, in turn, delivers six corresponding output signals a' to f'. Auxiliary decay circuit 20 contains an inverting AND gate 30, twelve inverting AND gates 31 to 42, and six additional inverting AND gates 51 to 56, connected in a logic circuit. One half of the AND gates 31 to 42 is addressed by the output signal $\overline{y}$ of AND gate 30 and the other half, by the control signal y directly. Each of the output signals a to f is fed to the other halves of two of the AND gates 31 to 42; for instance, output signal a is fed to the other halves of the AND gates 32 and 33. Each pair of adjacent AND gates 31 to 42 is further associated with one of the AND gates 51 to 56, the output of each gate being connected to one half thereof. The output signals a' to f' are taken off at the outputs of AND gates 51 to 56.

Operation of auxiliary decay circuit 20 is explained below in connection with the wave forms of FIGS. 7-21. In FIG. 7, the waveform of keying signal p is plotted as a function of the time t. A single keying pulse of width P is shown, which extends up to the time $t_e$; the end of this keying pulse is to be ascertainable on the receiver side as precisely as possible. Control device 22 contains an oscillator which generates control signal x, shown in FIG. 8, extending through the time $t_e$ to the time $t_z$, the period $(t_e+t_z)$. Control signal x consists of a sequence of equidistant spikes, the frequency of which is equal to six times the audio frequency $f_t$. From this, control unit 19 produces, on each output lead, by means of the flip-flops 27 to 29, and up to the time $t_e$, the output signals a to f, shown in FIGS. 9 to 14. These pulses are each 180° long and are displaced 60° relative to each other. So long as no control signal y is present, the output signals a to f pass through auxiliary decay circuit 20 unchanged and constitute output signals a' to f', the six control signals for the six controlled valves of inverter 3.

The waveform of control signal y is shown in FIG. 15; it begins at time $t_e$, the end of the keying pulse (see FIG. 7), and lasts for the time $t_z$. Here, length of time $t_z$ is chosen for each keying pulse so that after the time $t_z$ has passed, the AC voltage $U_k$ has largely decayed as expected (see FIGS. 4 and 5). In practice, the time $t_z$ is always chosen shorter than the time $t_e'$.

When a control signal y larger than zero is applied to terminal 23 of auxiliary decay circuit 20, inverting gate 30 activates each of the flip-flops 31 to 32 and shifts their output signals 180° relative to each other. This means that, for instance, the output signal a' appearing at the first output now appears at the second output and becomes the output signal d', while the output signal d' appearing at the second output now appears at the first output and becomes the output signal a'. This is shown in FIGS. 16 to 21 for the output signals a' to f'. A phase jump of 180° is therefore obtained at the time $t_e$; i.e., the AC output voltage $U_t$ jumps into phase opposition (see FIG. 4).

The phase opposition is maintained for the predetermined time $t_z$. At the end of the period $(t_e+t_z)$, inverter 3 is switched off and the operation is repeated at the end of the next transmitted pulse.

What is claimed is:

1. A method for reducing ringing in a coupling network of a powerline carrier control transmitter having a pulsed inverter for generating signals comprising keyed trains of audio output voltage pulses, the ringing occurring after transmission of the last pulse in each signal train, comprising the steps of:
   shifting the output of the transmitter into phase opposition, relative to the phase of the ringing in the coupling network, at the end of the last pulse in each keyed train.

2. The method of claim 1 in which the output of the transmitter is shifted 180°.

3. The method of claim 1 in which the coupling network has a given decay time and the duration of transmission with phase opposition is less than the decay time of the coupling network.

4. The method of claim 1 including the steps of:
   shifting the phase by an intermediate value of something less than 180°, and
   then shifting the phase by 180°.

5. In a powerline control transmitter having a pulsed inverter for transmitting signals comprising keyed trains of audio frequency pulses at a first frequency on a transmission line carrying AC power at a second frequency, the pulsed inverter being coupled to the transmission line via a coupling unit in which a decaying voltage continues to oscillate when keying of a signal is stopped, the improvement comprising:
   means for continuing transmission of each signal train for a short time after keying of the signal train is stopped, and
   means for modifying the signal train transmitted during the short time to offset the decaying voltage in the coupling unit.

6. A powerline carrier control system in accordance with claim 5 in which the means for modifying the output voltage at the end of the transmitting pulse first shifts the phase by an intermediate value of something less than 180° and then by 180°.

7. A powerline control transmitter in accordance with claim 5 in which the audio frequency pulses each comprise a voltage pulse of predetermined phase in which the means for modifying the signal transmitted comprises:
   means for switching the phase of the audio frequency voltage applied to the coupling unit into phase opposition to the decaying oscillation voltage in the coupling unit.

8. A powerline control transmitter in accordance with claim 7 in which the phase of the audio frequency voltage applied to the coupling unit is shifted 180° immediately at the end of each train of pulses in the keyed signal.

9. A powerline control carrier system in accordance with claim 8 in which the pulsed inverter comprises controlled valves and a logic network for generating firing signals for the controlled valves in a predetermined order and further comprising:

the means for modifying the signal transmitted comprising a switch for reversing the order of the firing signals generated by the network by 180° relative to each other.

10. The powerline carrier control system of claim 8 for use with a multiphase transmission line further comprising:

means for generating related sets of firing signals, each in a predetermined order, for driving the controlled valves in the pulsed inverter to generate signals comprising keyed trains of audio frequency pulses for transmission on each phase of the multiphase transmission line; and means for reversing the order of each set of firing signals by 180° when keying of the last pulse in each train of pulses is stopped.

* * * * *